April 25, 1939.   R. ZAVARELLA   2,155,521
FRONT WHEEL SUSPENSION FOR MOTOR VEHICLES
Original Filed April 23, 1936
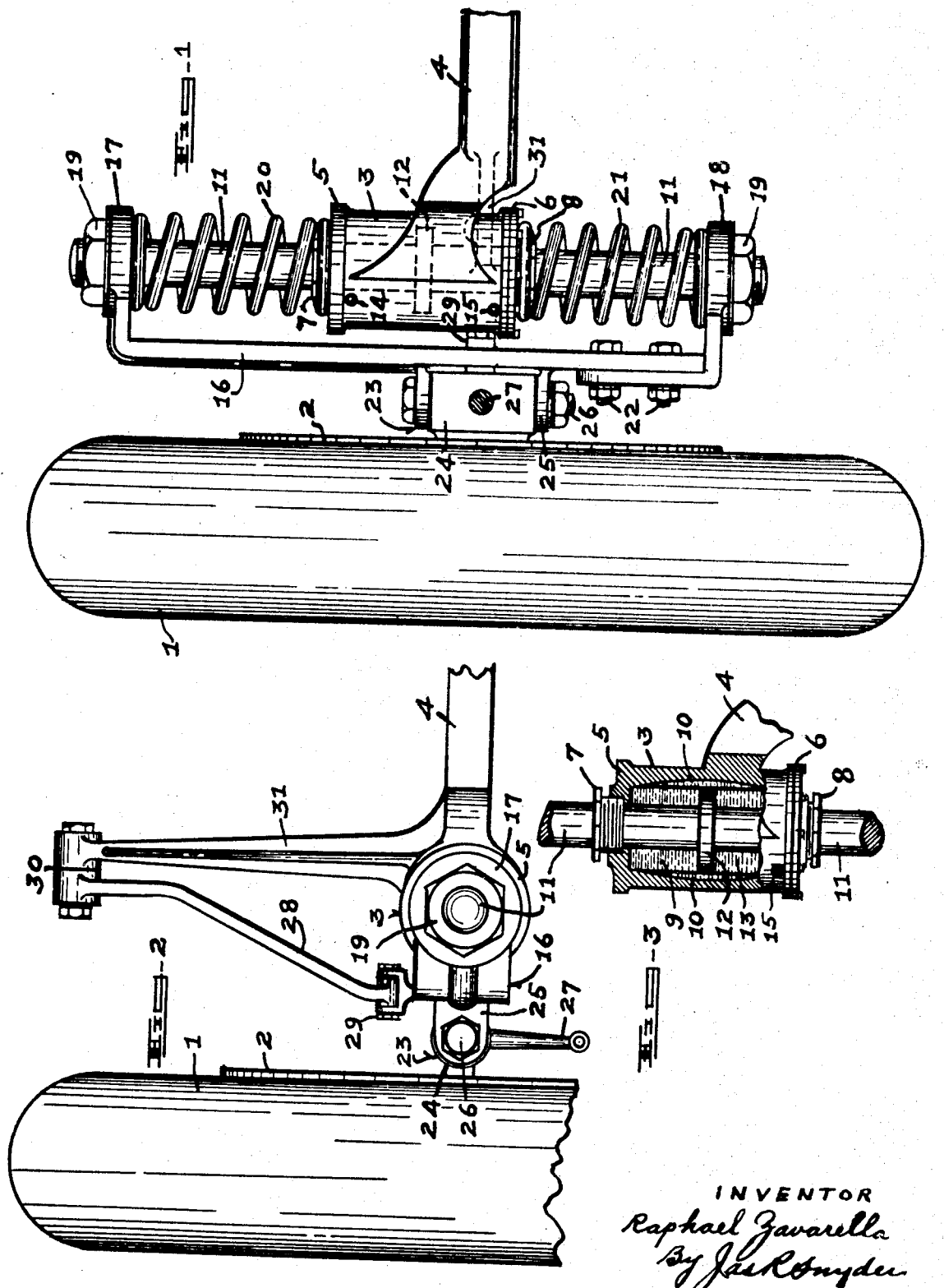
INVENTOR
Raphael Zavarella
By Jack R Snyder
Attorney Patented Apr. 25, 1939

2,155,521

UNITED STATES PATENT OFFICE 2,155,521

FRONT WHEEL SUSPENSION FOR MOTOR VEHICLES

Raphael Zavarella, Pittsburgh, Pa., assignor of one-half to Cornelius D. Scully, and one-fourth to Harold K. Brooks, both of Pittsburgh, Pa., and one-fourth to John A. Rykaczewski, Braddock, Pa.

Application April 23, 1936, Serial No. 75,988
Renewed September 15, 1938

1 Claim. (Cl. 280—124)

This invention relates to a front wheel suspension, of the knee-action type, for motor vehicles, and important objects of the invention are to provide a front wheel suspension of the character described, which embodies the advantages of employing and combining hydraulic and mechanical elements and operations; which obviates the use of the usual stiff short-travel leaf springs now commonly used to also serve as structural members; which is attached to the vehicle in such a way that the front wheels are free to move up and down independently of each other, allowing one wheel to pass over a road inequality without affecting the opposite wheel; and which employs long-travel, soft-acting coil springs, with a resilience matched up to harmonize with the rear springs of the vehicle, whereby jolts, shocks, and jars from high-speed car travel are completely absorbed and eliminated.

Further objects of the invention are to provide a wheel suspension of the type stated, which will facilitate steering and minimize tire wear, which give the vehicle stability on the road when rounding curves at high speeds or when braking suddenly, which is simple in its construction and arrangement as it embodies comparatively few parts, which is durable and efficient in its use, compact, attractive in appearance, positive in its action, and economical in its manufacture, installation, and maintenance.

With the foregoing and other objects in view which will appear as the description proceeds, the invention resides in the novel construction, combination, and arrangement of parts herein specifically described and illustrated in the accompanying drawing, but it is to be understood that the latter is merely illustrative of an embodiment of the invention, and that the actual needs of practice and manufacture may require certain mechanical variations from the embodiment shown. It is, therefore, not intended to limit the invention to the disclosure thereof herein illustrated, but rather to define such limitations to the scope of the claim hereunto appended.

In the drawing wherein like numerals of reference designate corresponding parts throughout the several views:

Figure 1 is a rear elevational view of a front wheel suspension constructed in accordance with the invention.

Figure 2 is a top plan view thereof.

Figure 3 is a rear elevational view, partly in cross section, of the supporting cylinder embodied in the present invention.

Referring in detail to the drawing, 1 denotes the front wheel of a motor vehicle. The wheel is rotatably secured, in any suitable manner, to the proper revoluble member of the brake housing mechanism, which latter also includes the usual stationary brake housing plate 2 disposed at the inner side of the wheel.

The present invention comprises a vertically extending cylinder 3, which is rigidly fixed in position, in any suitable manner, to the axle 4 of the motor vehicle, or to any other suitable part or member of the latter. The cylinder is spaced from but disposed adjacent to the inner side of the wheel, and the greater portion thereof projects above the axis of the latter.

The cylinder 3 includes a head 5 at its upper end and a head 6, which is removable, at its lower end. Bearings 7 and 8, serving as packing glands, are mounted in respective cylinder heads. The wall of the cylinder bore 9 is formed with a pair of diametrically opposed passages 10, which extend vertically throughout the length of said bore. Each of the passages 10 gradually increases in depth and capacity area from respective ends thereof toward its transverse center, as clearly illustrated in Figure 3.

A piston rod 11, carrying a fixed piston 12 disposed in the cylinder bore 9, extends vertically through the cylinder 3, and is engaged for vertical reciprocal movement in the bearings 7 and 8 mounted in respective cylinder heads 5 and 6. When in the neutral position, the piston is disposed at the transverse center of the cylinder, as shown in Figure 3.

The cylinder bore 9 is filled with a suitable operating fluid 13, preferably in the form of a liquid, and the cylinder 3 is provided with suitably located plugs 14 and 15 for filling and draining purposes, respectively.

During the vertical reciprocal movement of the piston 12 in the cylinder bore 9, the fluid 13 will be forced through the passages 10 in the direction conversely to the direction of the travel of the piston. Owing to the conformation of the passages 10, as set forth, resistance to the flow of the fluid gradually increases as the piston moves from its transverse central or neutral position in the piston bore toward either end of the latter.

A connecting yoke 16 is disposed between the wheel 1 and the cylinder 3. The connecting yoke extends vertically parallel relatively to the cylinder, and is provided with a pair of attaching heads, respectively indicated at 17 and 18, which projects inwardly at right angles from respective ends of said connecting yoke. The end portions of the piston rod 11 are threaded and project through apertures provided therefor in respective attaching heads 17 and 18. The piston rod is fixedly held in the attaching heads by means of nuts 19, which are engaged on the threaded end portions of the piston rod, and allow the vertical adjustment of the latter in the attaching heads to provide the proper adjustment of the piston 12 in the cylinder bore 9.

A pair of coil springs, respectively indicated at 20 and 21, is mounted on the piston rod 11, which extends a considerable distance beyond each end of the cylinder 3. The spring 20 is engaged between the yoke head 17 and the cylinder head 5, and the spring 21 is engaged between the yoke head 18 and the cylinder head 6. The yoke head 18 is preferably detachably secured to the connecting yoke 16, by means of bolts 22, to allow and facilitate the removal and reassembly of the associated parts of the device when required for repairs, replacements, or for any other purposes.

A steering knuckle 23 is disposed between the inner side of the wheel 1 and the outer side of the connecting yoke 16. The steering-knuckle comprises the pivot hub 24 fixed to the brake housing plate 2, and the pivot lugs 25 fixed to the connecting yoke. It is evident that the positions of the hub and lugs may be reversed without affecting the operation of the steering-knuckle. The pivot hub and pivot lugs are pivotally joined together in the usual manner by a steering-knuckle pin or bolt 26. The pivot hub carries a steering lever 27, which is connected by a suitable steering linkage to the steering mechanism of the vehicle in the manner well known in the art to which the invention appertains.

A bracing bar 28 is provided for maintaining the connecting yoke 16 in its proper radial position with respect to the axis of the cylinder 3. The bracing bar is normally disposed horizontally, and has its rear end pivotally connected, as at 29, to the front of the connecting yoke. The bracing bar extends forwardly and is laterally offset inwardly to provide ample wheel-clearance to allow the necessary steering operations. The forward end of the bracing bar is pivotally connected, as at 30, to the forward end of a supporting arm 31. The latter is rigidly fixed in position and has its rear end fixedly secured to the cylinder 3 and to the associated axle 4, as clearly illustrated in Figure 2, in any suitable manner.

In the use of my improved suspension, one wheel is allowed to pass over depressions and bumps in the road without affecting the opposite front wheel. When the wheel passes over any road inequalities it will move up and down with the movement of the piston rod 11 as the latter reciprocates vertically in the cylinder 3, and all shocks, recoils, jolts and jars from untoward road conditions will be minimized and absorbed by the operations of the coil springs on the piston rod, combined with the operation of the piston 12 in displacing the fluid 13 in the cylinder 3.

An important feature of the invention resides in the function of the bracing bar 28. When the wheel 1 passes over a bump or depression in the road, it will move up and down and impart a similar movement to the piston rod 11 and to the connecting yoke 16. Such vertical movement of the connecting yoke will elevate or lower the rear end of the bracing bar connected therewith, to dispose the latter at an angle from the horizontal normal position, whereby said bracing bar will exert a decided forward pull on the connecting yoke and aid in drawing the wheel over a bump or from a depression in the road. The forward pull of the bracing bar, when shifted from its normal horizontal position as stated, will also draw the connecting yoke forwardly a slight distance on its connection with the cylinder 3 through the piston rod 11, but will not disturb the steered position of the wheel.

While the pivotal connection 29 of the bracing bar 28 with the connecting yoke 16 is not designed for radial movement of the latter, the movement is slight enough so that a universal joint is not necessary, as the wheel 1 moves slightly inwardly in addition to moving ahead. The tie rod pivot moving in an arc about the opposite end of the tie rod also moves slightly inwardly and allows the steering lever 27 to remain in a substantially parallel position, slightly ahead of and inwardly from its normal position. The steering knuckle would rotate relatively to the connecting yoke during this action.

The present invention provides a durable, dependable and safe front wheel suspension, which increases riding comfort, facilitates steering, maintains the wheels in proper alignment, and which will minimize the rate of car depreciation by protecting the vital units of the chassis in reducing undue stress, strain, and vibration.

What I claim is:

In a front wheel suspension for motor vehicles, the combination with a vehicle chassis, of a vertically disposed cylinder fixed in position to the chassis, a connecting yoke revolubly supporting a vehicle wheel, a piston rod extending vertically through said cylinder and projecting beyond respective ends of the latter adjustably connected to said yoke, a piston disposed in said cylinder fixed on said rod, operating fluid carried in said cylinder, the wall of the bore of said cylinder provided with a pair of vertically extending diametrically disposed passages, each of said pair of passages increasing in capacity area from the respective ends thereof toward its transverse center for varying the rate of displacement of said fluid during the reciprocal travel of said piston in said cylinder, a pair of coil springs mounted on respective projecting ends of said rod and engaging respective ends of said yoke and of said cylinder, a forwardly projecting arm fixed to said cylinder, and a bracing bar having a pivotal connection with the outer end of said arm and with said yoke for regulating the radial position of the latter relatively to the axis of said cylinder.

RAPHAEL ZAVARELLA.